Jan. 20, 1959

O. RENNER

2,869,510

ELECTROSTATIC COATING APPARATUS UTILIZING OVERFLOW
MEANS TO FACILITATE CONSTANT LEVEL

Filed July 29, 1953

Inventor:
OTTO RENNER
BY:

Jan. 20, 1959  O. RENNER  2,869,510
ELECTROSTATIC COATING APPARATUS UTILIZING OVERFLOW
MEANS TO FACILITATE CONSTANT LEVEL
Filed July 29, 1953  5 Sheets-Sheet 2

Inventor:
OTTO RENNER
BY:
Michael S Striker
agt.

Jan. 20, 1959　　　　　O. RENNER　　　　　2,869,510
ELECTROSTATIC COATING APPARATUS UTILIZING OVERFLOW
MEANS TO FACILITATE CONSTANT LEVEL
Filed July 29, 1953　　　　　　　　　　　　5 Sheets-Sheet 3

Inventor:
OTTO RENNER
BY:
Michael S. Striker
agt.

Jan. 20, 1959  O. RENNER  2,869,510
ELECTROSTATIC COATING APPARATUS UTILIZING OVERFLOW
MEANS TO FACILITATE CONSTANT LEVEL
Filed July 29, 1953  5 Sheets-Sheet 4

Inventor:
Otto Renner
By:
Michael S. Striker
agt.

Jan. 20, 1959   O. RENNER   2,869,510
ELECTROSTATIC COATING APPARATUS UTILIZING OVERFLOW
MEANS TO FACILITATE CONSTANT LEVEL
Filed July 29, 1953   5 Sheets-Sheet 5

Inventor:
OTTO RENNER
BY:
Michael S. Striker
agt.

United States Patent Office 2,869,510
Patented Jan. 20, 1959

2,869,510

ELECTROSTATIC COATING APPARATUS UTILIZING OVERFLOW MEANS TO FACILITATE CONSTANT LEVEL

Otto Renner, Frankfurt am Main, Germany, assignor to Licentia Patent-Verwaltungs G. m. b. H., Hamburg, Germany Application July 29, 1953, Serial No. 371,083

Claims priority, application Germany July 29, 1952

18 Claims. (Cl. 118—626)

The present invention relates to electrostatic spraying apparatus, and more particularly to an electrostatic spraying apparatus in which a fluid medium is atomized in an electrostatic field which is created between the apparatus containing the medium to be sprayed and objects to be coated.

It is an object of the present invention to provide an electrostatic spraying apparatus in which the level of the medium to be sprayed is maintained in a container at the level of a spraying edge.

It is another object of the present invention to provide the container with a sharp spraying edge, and to provide means for adjusting the position of the container so that the spraying edge is accurately located at the surface level of the spraying medium contained in the container.

It is a further object of the present invention to influence the sprayed medium passing over the spraying edge for deflecting, concentrating, or reciprocating the spray on its way toward the object to be sprayed.

It is a still further object of the present invention to deflect, or concentrate or reciprocate the spray by additional electrodes.

It is yet another object of the present invention to provide means for creating a current of atmospheric gaseous matter between the container and the objects to be sprayed so as to influence the path of movement of the spray.

It is a further object of the present invention to provide overflow means on the container to discharge excess liquid which is supplied to the container but not sprayed over the spring edge.

It is also an object of the present invention to provide containers for the medium to be sprayed having a bottom portion defining an acute angle with the horizontal, and ending at the higher end in a sharp spraying edge so that the portion of the medium located above said bottom portion tapers towards said spraying edge.

With these objects in view the present invention mainly consists in an electrostatic spraying apparatus, comprising in combination, container means formed with at least one opening at least partly bounded by a spraying edge, means for supplying to the container means a medium adapted to be sprayed, means for keeping in the container means the level of the medium to be sprayed on the level of the edge, conductor means located opposite the container means and the edge, and a source of voltage connected to the conductor means and to the container means for producing a difference in potential between the container means and the conductor means thereby the medium is urged to pass over the edge toward the conductor means in an atomized condition.

A preferred embodiment of the present invention is an electrostatic spraying apparatus which comprises in combination supporting means, a plurality of containers mounted on the supporting means at different levels, each container being mounted on the supporting means turnable about at least one horizontal axis and being formed with an opening at least partly bounded by a sharp spraying edge, means for adjusting the position of each of said containers, pump means for supplying into the highest container a liquid medium adapted to be sprayed, flexible conduit means connecting the pump means with the highest container, overflow means on each of the containers for keeping the level of the medium on the level of the spraying edge associated therewith, a receptacle communicating with the overflow means of the lowermost container for receiving liquid medium overflowing from the same, flexible overflow conduit means connecting the overflow means of containers located higher than the lowermost container with the container located directly underneath the same, conductor means located opposite the containers and the spraying edges, a source of voltage connected to the conductor means and to the containers for producing a difference in potential between the containers and the conductor means whereby the liquid medium is urged to pass over the spraying edges toward the conductor means in an atomized condition, a plurality of additional electrode means located intermediate the containers and the conductor means, at least one additional electrode means being arranged in the region of each of the containers, the additional electrode means being electrically connected to the source of voltage for producing an additional potential capable of influencing the sprays of the medium passing over the spraying edges, and means for moving atmospheric gaseous matter between the spraying edge and the conductor means.

A preferred method according to the present invention comprises in combination the steps of producing a difference in potential between at least one conductive member located at the level of the surface of a liquid medium adapted to be sprayed, and between a conductor means located opposite the conductive member so as to produce an electrostatic field urging the medium in the form of a spray toward the conductor, and producing at least one additional potential intermediate the conductor and the conductive member for controlling the spray of the medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 1A:
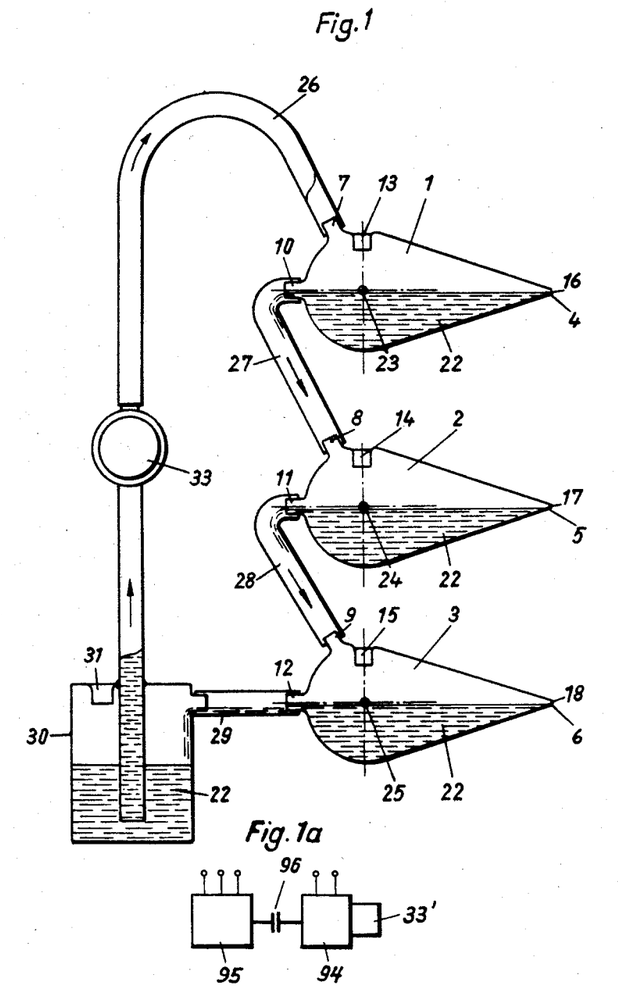
Fig. 1 is a front view, partly in section, of a preferred embodiment of the present invention.
Fig. 1a is a side view, showing a constructive detail of the present invention.

Referring now to the drawing and more particularly to Fig. 1, the electrostatic spraying apparatus illustrated in this figure comprises three containers 1, 2, 3 which are arranged at different levels. Each of the containers is a symmetrical body of revolution having its axis extending in horizontal direction. The containers 1, 2, 3 are mounted on supporting means, not shown in Fig. 1, turnable about horizontal axes 23, 24, 25 so that the position of the openings 16, 17 and 18 whose lower portion are bounded by sharp edges 4, 5, 6 may be adjusted. In this manner it is possible to place the sharp spraying edges 4, 5, 6 exactly at the level of a suitable fluid, preferably liquid, spraying medium 22, such level being maintained by overflow means 10, 11 and 12, respectively, which communicate with the overflow conduits 27 and 28 and with the conduit 29 through which the spraying medium overflowing from container 3 passes into a receptacle 30 from which it is pumped by a pump 33 through the conduit 26 into the highest container 1. An inlet means 31 is provided for refilling the receptacle 30. Openings 13, 14, 15 are respectively provided in the containers 1, 2, 3 to equalize the pressure therein. The conduits 26, 27, 28 and 29 are preferably made at least partly of flexible hose so that adjustment of the containers is facilitated.

In the arrangement shown in Fig. 1a the generator 94 and the pump 33' are driven by the same motor 95 by means of the clutch 96.

Figures 4, 5:
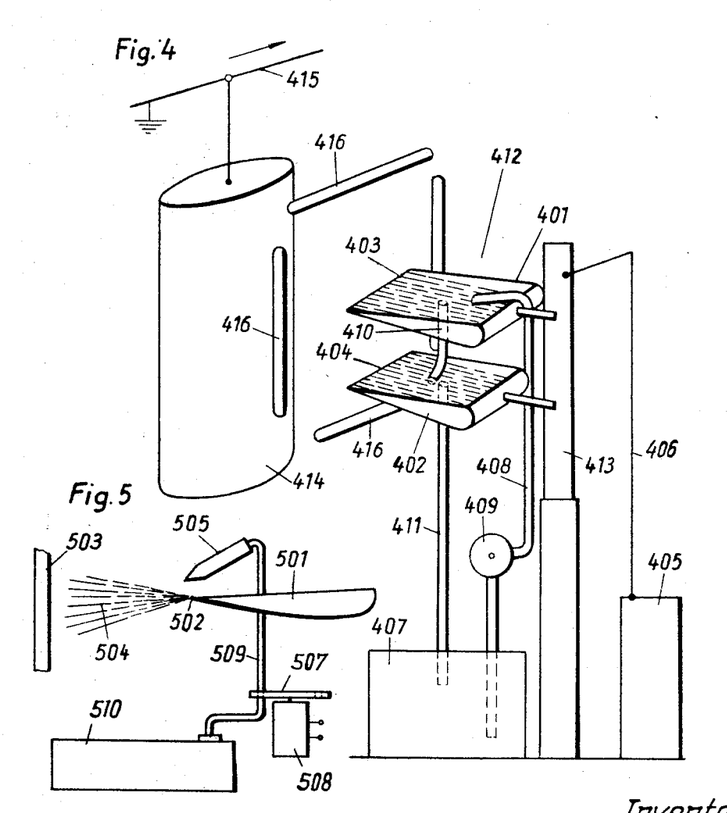
Fig. 4 is a schematic view of a modified embodiment of the present invention.
Fig. 5 is a side view of a detail of a further modification of the present invention.

Referring now to the embodiment shown in Fig. 4, the medium to be sprayed is contained in two containers 401 and 402 which are located at different levels. The shape of the containers 401 and 402 is different from the embodiment shown in Fig. 1, inasmuch as the containers are shovel-shaped and open on top so that the spraying edges 403 and 404 are straight and elongated. This shape of the edges is advantageous for spraying large surfaces. The circulation of the medium is produced by the pump 409 which supplies through a conduit 408 the liquid into the container 401. An overflow conduit 410 transfers excess of the liquid medium to the lower container 402, while another overflow conduit 411 maintains the level in the container 402. Liquid overflowing from container 402 passes to the receptacle 407 and is again circulated by pump 409. Sprayed medium is replaced by refilling the receptacle 407. The containers 401 and 402 are adjustably supported on the supporting means 413. For the operation of the apparatus it is necessary that the spraying edges 403 and 404 are located exactly in the level of the medium to be sprayed.

Opposite the spraying edges 403, 404 a conveyor means 415 is arranged which carries object 414 which is to be sprayed. The conveyor means 415 is grounded, and the electrically conductive support 413 is connected by means of a conductor 406 to one terminal of a source of high voltage 405 which may be a generator or a high voltage transformer combined with a rectifier such as a selenium rectifier. The other terminal of the source of high voltage 405 is grounded so that there is a difference in potential between the spraying edges 403 and 404 on one hand and the conductor 415, and the workpiece 414 on the other hand.

Portions of the bottoms of the containers shown in Figs. 1 and 4 are inclined at an acute angle to the horizontal and terminate in horizontal elongated straight spraying edges so that the body of the fluid medium which is located adjacent the spraying edge gradually tapers toward the spraying edge.

Figure 2:
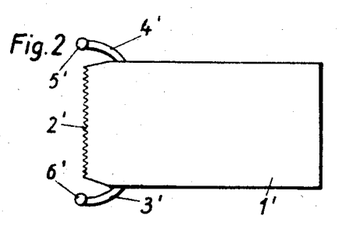
Fig. 2 is a plan view of a modified detail of the invention.

The spraying edge is preferably serrated. Fig. 2 shows a container 1' provided with an elongated serrated spraying edge 2' facilitating the atomizing of the medium.

Figures 8, 8A:
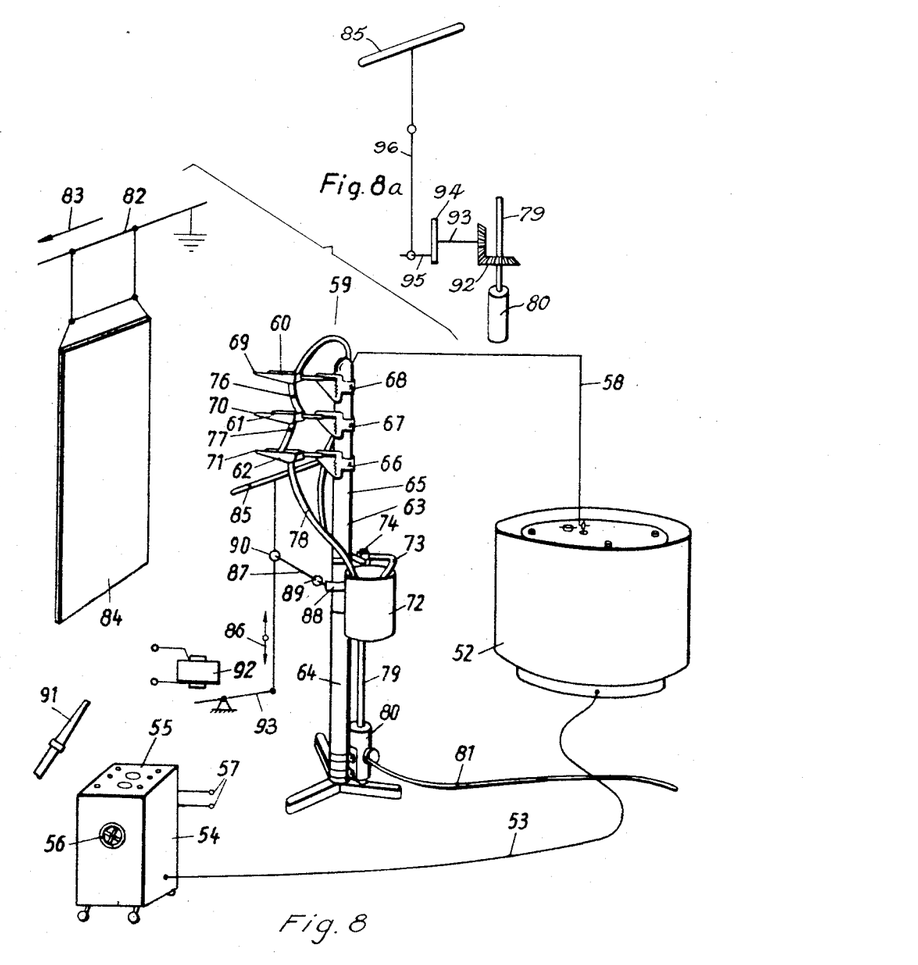
Fig. 8 is a schematic view showing a preferred arrangement of the present invention.
Fig. 8a is a schematic view illustrating a modified detail.
Figure 9:
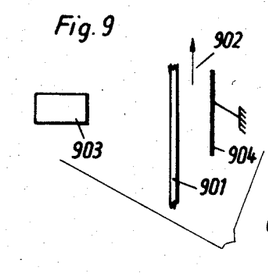
Figs. 9–14 are side views or schematic views of modified embodiments of the invention.
Figure 10:
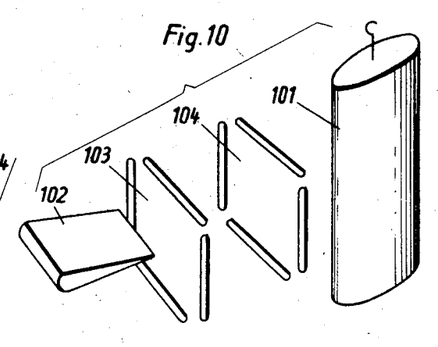
Figure 11:
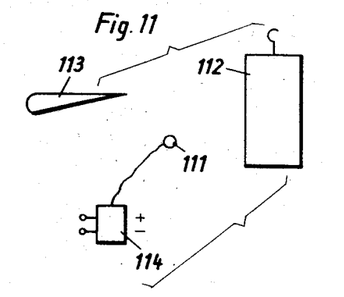
Figure 12:
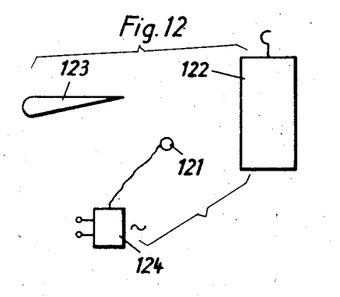

In the arrangement shown in Fig. 8 three containers 60, 61 and 62 are mounted by means of adjustable supporting means 68, 67 and 66 on a supporting column 63. The upper part of the supporting column 63 is made of an electrically conductive material, while the lower part 64 is made of insulating material. The spraying edges 69, 70 and 77 are maintained at the level of the liquid medium to be sprayed by adjustment of the supporting means 66, 67, 68.

The receptacle 72 is secured to the supporting column, and the sprayed liquid, for instance lacquer, is pumped by the pump 74 through conduit 73 and conduit 59 into the top container 60 from which it passes through overflow conduits 76 and 77 to the lower containers, while the lowermost container is connected by overflow conduit 78 to the receptacle 72. The pump 74 is driven through the shaft 79 by the motor 80 which is connected by the cable 81 to a source of electric current.

The high voltage generator 52 is connected by conductor 58 to the conductive portion 65 of the supporting column. A control device 54 is connected by a cable 53 to the generator 52, and the voltage of the generator is regulated by turning the hand wheel 56. On top of the control device measuring instruments and control knobs 55 are provided. The control device, and thereby the generator, is connected by conductors 57 to a source of electric energy.

A conveyor means 82 carries an object to be sprayed 84 and moves the same in the direction of the arrow 83 past the containers. The conveyor means are grounded and electrically connected to the conductive object 84. One terminal of the generator 52 is also grounded.

Figure 6:
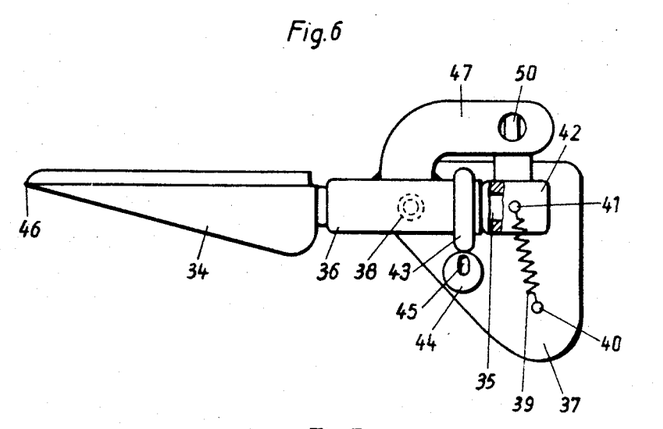
Fig. 6 is a side view showing a constructive detail of the present invention.
Figure 7:
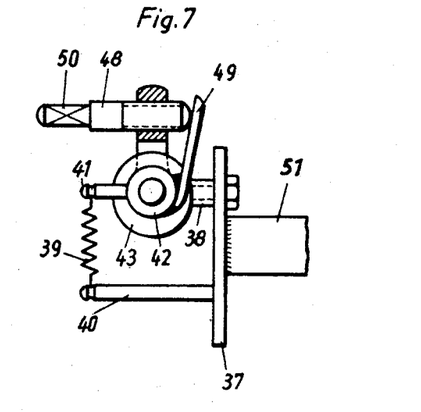
Fig. 7 is a rear view to Fig. 6.

The embodiments of the invention shown in Figs. 4 and 8 require accurate means for adjusting the long straight spraying edges to the surface level of the liquid to be sprayed, and for this purpose an adjusting arrangement is provided which is best shown in Figs. 6 and 7. Some parts are omitted in Fig. 7 for the sake of clarity.

The shovel-shaped container 34 for the spraying medium has an upwardly inclined bottom portion ending in an elongated horizontal spraying edge 46. The container 34 is secured to a shaft 35 and is rotatable with the same in a bushing 36. Bushing 36 is turnably mounted on a pin 38 which is secured to a supporting plate 37 so that the bushing 36, the shaft 35, and the container 34 can be turned about the horizontal axis of pin 38 into a position in which the spraying edge 46 is located at the surface level of a liquid medium in the container 34. The weight of the container 34 is balanced by a spring 39. One end of the spring is secured to a pin 41, while the other end is secured to a pin 40. Pin 40 is secured to the supporting plate 37 which is mounted by means of a member 51 to the supporting column 65 in Fig. 8. The other pin 41 is secured to a sleeve member 42 which is keyed to the free end of the shaft 35.

The container 34 is turned about the horizontal axis of the pin 38 by a pair of eccentric members 43 and 44. The eccentric ring 43 surrounds the bushing 36 and is rotatably mounted thereon so that rotation of the eccentric ring 43 will effect a pivoting of the shaft 35 and the container 34 since the eccentric 44 constitutes in any position an abutment means for the eccentric ring 43. The ring 43 serves for rough adjustment, while a rotation of the eccentric 44 will effect fine adjustment of the container 34. The eccentric 44 is manually adjusted by means of an insulating operating means 45 so that it is possible to adjust the position of the container edge during operation of the apparatus at high voltage.

While the pair of eccentric means 43 and 44 serve for adjusting the position of the spraying edge 46 in vertical direction, the horizontal extension of the spraying edge is independently adjusted in order to assure that the entire length of the spraying edge is located at the surface level of the liquid medium in the container 34.

For this purpose a knee-shaped member 47 is fixedly secured to the bushing 36 and provided with a threaded bore into which an adjusting screw 48 is threaded. This adjusting screw 48 is provided with a head 50 which is adapted to be engaged by an insulated operating means. The turnable sleeve member 42 is welded to a projecting arm 49 which is in engagement with the end of the adjusting screw 48.

It will be noted that the pin 41 and the projecting arm 49 are arranged on opposite sides of the sleeve member 42 so that the spring 39 tends to turn the sleeve member 42 in such direction as to maintain engagement between the projecting arm 49 and adjusting screw 48 while at the same time balancing the container. When the adjusting screw 48 is turned, the projecting arm 49 turns the sleeve member 42 and thereby the shaft 35 and the container edge 46 for obtaining an exactly horizontal position of the spraying edge.

The above described apparatus operates as follows:

The high voltage which is produced by means of the generator 52, or by a transformer and rectifier, preferably a selenium rectifier, is electrically connected to the containers, and since the object to be sprayed is a grounded conductor there is a difference in potential between the containers and the objects which causes the spraying medium to move toward the object.

In the event that a non-conductive object is to be sprayed, a grounded conductor is arranged behind the path of the moving object and opposite the spraying edges of the containers so that the spray moving toward the conductor is intercepted by the object to be sprayed. In order to utilize the electrostatic point effect, the spraying edge is sharp.

In the event that the containers are shaped with a round opening as shown in Fig. 1, the spray will be more concentrated than in the event that long straight spraying edges are provided as in the embodiment shown in Fig. 4 which is capable of producing a greater amount of spray for distribution to a larger area.

During the operation the amount of medium in the containers is continuously replenished by the pump 74 and by overflow means 76, 77 respectively so that the level of the medium is always maintained at the height to which the spraying edges were adjusted by adjusting means shown in Figs. 6 and 7. When the amount of spraying medium in the receptacles 30, 72 and 407, respectively, is reduced, the receptacles are refilled so that always sufficient spraying medium is present to maintain the circulation by the pump. In the illustrated arrangement three containers are arranged above one another, but it will be understood that small objects may be sprayed by a single container.

The pump is driven by suitable drive means such as an electric motor, or a compressed air motor. The electric motor which drives the pump may also be used for driving the generator. In this event the generator may be mounted on the same shaft as the motor and the pump.

The material of which the containers are made is preferably electrically conductive and made of metal, or of an insulating material having limited conductivity, and in this event the spraying edges are obviously directly connected to the high voltage.

If the containers are made of insulating material, a spraying effect can nevertheless be obtained if the sprayed medium has the electric conductivity required for producing an electrostatic field. If this is not the case, the containers can be coated by an electrically conductive layer.

The flow of spraying medium may be stopped by pivoting the container about its horizontal axis so that the spraying edge is located above the surface level of the medium. While thereby spraying is terminated, the spraying edge remains wet which causes deposits of dried medium on the spraying edge which must be removed before the next operation.

According to a modified embodiment of the present invention a non-wettable material is therefore used for the spraying edge whereby this disadvantage is overcome. It is advantageous to provide the spraying edge with a coating consisting of a non-wettable material. For instance, the non-wetting effect takes place when water is sprayed from a spraying edge consisting of pressed Bakelite.

For an economical operation of the arrangement of the present invention it is desirable that no more material is sprayed than is required for the coating of the objects which are transported past the spraying container. Since a series of objects passes the containers consecutively, the medium that is sprayed into the space between the objects is wasted.

According to a preferred method of the present invention an electric conductor means constituting an additional electrode means and having the same potential as the spraying edge is arranged behind the path of the object to be sprayed, and opposite the spraying edges. Such electric conductor is shielded by the object when the same is in spraying position so that the grounded object attracts the spray and is sprayed. When, however, the objects are carried by the conveyer means into a position in which the container is located opposite the space between two objects, the same potential is present at the spraying edge and at the electrode behind the path of the object so that no spray leaves the container.

By adjusting the potential of similar additional electrodes it is possible to reduce the electrostatic field between the spraying edge and the objects so that the amount of spray can be regulated by adjusting the potential of an additional electrode.

During practical operation of the containers having elongated spraying edges as shown in Fig. 4, it has been found that when certain spraying liquids are used, the spray passing over the center portions of the spraying edges moves in a desired direction, while at the ends of the spraying edges the spray moves in unpredictable directions. Such uncontrolled sprays can be suppressed in a simple manner by providing projecting arms at the containers which have the same potential as the spraying edges.

Figure 3:
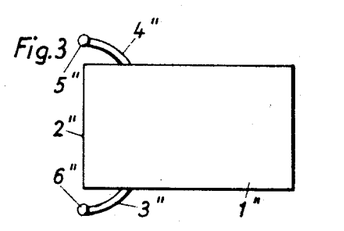
Fig. 3 is a plan view of a modified detail.

An arrangement of this type is illustrated in Figs. 2 and 3. The shovel-shaped containers 1' and 1" have elongated spraying edges 2' and 2", respectively. Projecting arms 3', and 3" and 4', 4" respectively are provided which end in balls 5', 5", 6' and 6", respectively. The ball-shaped end members 5 and 6 get the potential of the spraying edges 2, and constitute additional deflecting electrodes influencing and controlling the sprayed medium at the ends of the spraying edges to move in the desired direction.

According to the preferred method of the present invention the spray is influenced on its way towards the object to be sprayed by other additional electrodes, more particularly by deflecting electrodes, which have the same potential as the spraying device and are arranged intermediate the spraying edges and the object to be sprayed.

In the event that a single container is used from which a single jet of spray is emitted, a single additional electrode is sufficient. If a spraying apparatus is used which consists of several containers and produces a plurality of sprays, a single electrode acting on the entire group of sprays, or a set of additional electrodes may be provided. In the latter arrangement one additional electrode is associated with and cooperates with each of the spraying containers.

In the event that the distance between the spraying edges and the objects is comparatively great, it is advantageous to arrange several additional electrodes behind one another along the path of the spray in the direction of the lines of force of the electrostatic field.

The additional electrodes are constructed in various shapes according to the purpose for which they are provided. For deflecting the spray, for instance for raising or lowering the same, or for turning an elongated spray produced by a long straight spraying edge, one or several rod-shaped electrodes are provided. Turning the spray from a horizontal position to a vertical position is advantageous for spraying vertically elongated areas.

For concentrating the spray preferably a set of rod-shaped electrodes is provided which are arranged to surround the jet of spray produced by one spraying edge, or a plurality of sprays produced by a multiple spraying apparatus having several containers. The rod-shaped additional electrodes may be arranged in a rectangle or in a circle, and several rings consisting of rod-shaped electrodes can be arranged behind each other. Of course, it is also possible to use annular additional electrodes which may have rectangular, elliptic or circular shape. Preferably such annular electrodes are adjustable so that the diameter thereof may be changed.

In the event that additional electrodes are directly connected to the spraying edges, or are connected to an independent source of direct voltage, the potential of the electrodes is given. The additional electrodes may also be insulated from the spraying apparatus, and be charged during the spraying to receive the potential of the spraying edge from the sprayed stream of material.

Figure 13:
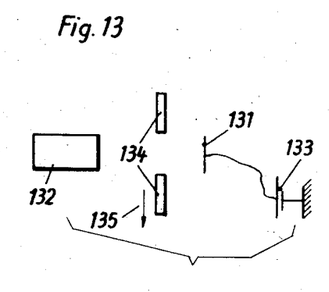

According to a preferred method of the present invention the spray is reciprocated in transverse direction for distribution over a larger area of the object. This is obtained by movably mounting additional electrodes, and reciprocating the same so that the stream of sprayed material is also alternately deflected in transverse directions. Such movement may be produced by electromagnets, a compressed air motor or by the pump motor.

The same result is obtained if the additional electrodes are not provided with a direct potential but with an alternating potential by connecting the additional electrode to a source of alternating voltage. The alternating potential effects a transverse swinging of the spray and a distribution of the same over a larger area. The two arrangements may be combined in mechanically reciprocated alternating voltage electrodes.

Additional adjustable electrodes arranged between spraying apparatus and the object to be sprayed are advantageously employed for reducing or increasing the amount of spray material passing toward the object to be sprayed.

Referring again to Fig. 4 four rod-shaped additional electrodes 416 are arranged in a rectangle intermediate the object 414, and the spraying apparatus. As clearly shown in this figure, the additional electrodes extend around the two jets of spray moving from the spraying edges 403, 404 toward the conductor means 414. The lines of force of the electrostatic field extend between the spraying edges 403, 404 and the conductor means 414, which is the object to be sprayed, and cause atomizing of the spraying medium contained in the open containers 401, 402 on the sharp spraying edges. The four rod-shaped electrodes 416 receive from the spray the potential of the spraying apparatus, and cause a concentration of the electrostatic field. However, as explained above, when connected to a source of alternating voltage, the electrodes will effect transverse oscillation of the spray.

Referring now to Fig. 8, underneath the spraying containers a single rod-shaped electrode 85 is arranged which is electrically connected to the conductive part 65 of the supporting column 63. The rod-shaped electrode 85 is reciprocated by suitable drive means in the direction of the arrow 86. The movable support of the electrode includes a supporting arm 87 and two joints 89 and 90 which are secured by means of a ring 88 to the supporting column. The movable support is reciprocated by the electromagnet 92, operating the two-armed lever 93.

The electrode and the movable support thereto can also be reciprocated by motor 80 through a suitable mechanical drive as shown in Fig. 8*a*, bevel gears 92, driven from motor 80 through shaft 79, rotate a crank drive 94, 95 whose connecting rod 96 reciprocates the electrode 85 and its movable support.

The sprayed material can be even better distributed if means are provided for producing a stream of gaseous matter which influences the spray moving toward the sprayed object. This method is particularly advantageous when an object is to be coated whose surfaces are not very well accessible to spray moving in the direction of the lines of force of the electrostatic field. This is the case if tubes are sprayed whose inner surfaces are at least partly screened off from the electrostatic field.

According to one embodiment of the invention a fan is provided which is periodically or continuously actuated to produce an air current transverse to the direction of movement of the spray whereby the spray is periodically or continuously deflected.

According to a preferred embodiment of the present invention the stream of air is produced by compressed air passing through a suitably arranged nozzle. Again the nozzle may cause intermittent blasts of air for periodically deflecting the spray.

Deflecting air nozzles may be arranged on one side, on top, or underneath the path of the spray for deflecting the same for a predetermined amount in a predetermined direction. According to a modified embodiment of the present invention an annular nozzle is provided which surrounds the spray, and produces a conical stream of air concentrating the spray onto a particular area of the object to be sprayed.

If it is desired to produce a transverse oscillation of the spray, nozzle means are arranged on either side of the spray and are alternately supplied with compressed air so as to produce a transverse reciprocation of the spray.

Referring now to Fig. 5, a container 501 is provided with a sharp spraying edge 502 over which the spray 504 passes toward an electric conductor means 503, which may be the object to be sprayed. A nozzle means 505 is arranged above the path of the spray inclined with respect to the horizontal, and deflects the spray 504 downwardly. In the event that compressed air is intermittently supplied to the nozzle 505, the spray will oscillate in vertical direction and be distributed over a larger area of the object 503.

For periodically producing air currents through the nozzle 505 a rotating disk 507 with a number of holes along the side is arranged, actuated by a motor 508. The disk 507 engages the air piping 509, connecting the nozzle 505 with the reservoir 510. By the perforated rotating disk 507 the air current is periodically interrupted.

In the arrangement shown in Fig. 8 a compressed air nozzle 91 is arranged underneath the spraying edges and deflects the spray upwardly, so that an intermittent stream of air produced by the nozzle 91 will effect a sweeping movement of the sprays produced by the three spraying edges 69, 70 and 71 over a larger area of the object 84.

Referring now to Fig. 9 a non-conductive object 901 is to be sprayed. The object 901 is moved in the direction of the arrow 902 between the container 903 and the grounded conductor 904. The conductor 904 is arranged for attracting the spray.

In the arrangement shown in Fig. 10 a plurality of additional electrode means are provided behind each other, intermediate the object 101 and the container 102. The rod-shaped electrodes 103 and 104 are arranged in two rectangles. The electrodes receive from the spray the potential of the spraying apparatus, and cause a concentration of the electrostatic field.

Referring to Fig. 11 the rod-shaped electrode 111 intermediate the object 112 to be sprayed, and the container 113 is charged by an independent source of direct voltage 114.

Referring to Fig. 12, the rod-shaped electrode 121 which is located intermediate the object 122 to be sprayed and the container 123, is charged by a independent source of alternating voltage.

In the arrangement shown in Fig. 13 an electrode 131 is provided for stopping the flow of spray when a space between two moving objects is located opposite the spraying container 132. The electrode 131 is charged by the source of direct voltage 133. The objects 134 are moved in the direction of the arrow 135.

Figure 14:
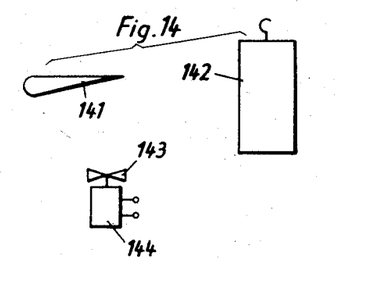

Fig. 14 shows an arrangement, in which the spray leaving the container 141 moving towards the object to be sprayed 142 is deflected by an air current. The air current is produced by the fan 143; actuated by the motor 144.

The electrostatic spraying arrangement according to the present invention permits spraying of conductive and non-conductive objects with lacquers and other paints, and thorough coating of objects having all kinds of shapes such as metal bands, pipes, containers, and so forth, while the sprayed material is most economically used.

It will be understood that each of the elements described above, or two or more together, may also find a useful application in other types of spraying apparatus differing from the types described above.

While the invention has been illustrated and described as embodied in an electrostatic spraying apparatus including container means having a sharp spraying edge, and comprising means for periodically deflecting the spray for distribution of the same over a large area, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Electrostatic spraying apparatus comprising, in combination, supporting means; a plurality of containers mounted one above the other on said supporting means, each container having an opening partly surrounded by a spray edge; means for supplying liquid to the top container and including a pump, a collecting receptacle underneath the lowermost container, and conduit means connecting the inlet of said pump with said collecting receptacle; means for maintaining liquid at a constant level in each container and including an overflow means in each container for maintaining the level of the liquid in the container constant and corresponding to the level of the respective spray edge, overflow conduit means connecting the overflow means of each container with the next lower container, and the overflow means of the lowermost container with said collecting receptacle, and a conduit means connecting said pump with the uppermost container; conductor means opposite said spray edges and containers and spaced from the same and adapted to support objects to be sprayed and to move them past the containers; a source of high voltage connected to said spray edges and to said conductor means; and spray control means for accelerating and directing spray to said conductor means.

2. Electrostatic spraying apparatus comprising in combination, a plurality of containers arranged at different levels, each container being formed with an opening at least partly bounded by a sharp spraying edge; pump means for supplying into the highest container a liquid medium adapted to be sprayed; overflow means on each of said containers for keeping the level of the medium at a constant level substantially at the elevation of the spraying edge associated therewith; a receptacle communicating with the overflow means of the lowermost container for receiving liquid medium overflowing from the same; overflow conduit means connecting said overflow means of containers located higher than said lowermost container with the container located directly underneath the same; conductor means located opposite said containers and said spraying edges and spaced from the same; and a source of voltage connected to said conductor means and to said containers for producing a difference in potential between said containers and said conductor means whereby said liquid medium is urged to pass over said spraying edges toward said conductor means in an atomized condition and whereby surplus medium supplied to said container means discharges through said overflow means.

3. Electrostatic spraying apparatus, comprising in combination, container means formed with at least one opening partly bounded by a horizontal elongated serrated spraying edge; means for supplying into said container means a medium adapted to be sprayed; overflow means for keeping in said container means the level of the medium to be sprayed at a constant level substantially at the elevation of said edge and spaced from the same; conductor means adapted to be connected to an object to be sprayed located opposite said container means and said edge; and a source of voltage connected to said conductor means and to said container means for producing a difference in potential between said container means and said conductor means whereby said medium is urged to pass over said edge toward said conductor means and said object and in an atomized condition and whereby surplus medium supplied to said container means discharges through said overflow means.

4. Electrostatic spraying apparatus, comprising in combination, container means formed with at least one opening partly bounded by a horizontal elongated straight spraying edge; means for supplying into said container means a medium adapted to be sprayed; overflow means for keeping in said container means the level of the medium to be sprayed at a constant level substantially at the elevation of said edge; conductor means adapted to be connected to an object to be sprayed located opposite said container means and said edge and spaced from the same; a source of voltage connected to said conductor means and to said container means for producing a difference in potential between said container means and said conductor means whereby said medium is urged to pass over said edge toward said conductor means and said object and in an atomized condition and whereby surplus medium supplied to said container means discharges through said overflow means; a pair of electrically conductive projecting arms, said arms being secured to said container means near to the ends of said elongated spraying edge, said arms having the same potential as said container means and being adapted to deflect said medium passing over said spraying edge.

5. Electrostatic spraying apparatus comprising in combination, a plurality of containers arranged at different levels, each container being formed with an opening at least partly bounded by a sharp spraying edge; pump means for supplying into the highest container a liquid medium adapted to be sprayed; overflow means on each of said containers for keeping the level of the medium at a constant level substantially at the elevation of the spraying edge associated therewith; a receptacle communicating with the overflow means of the lowermost container for receiving liquid medium overflowing from the same; overflow conduit means connecting said overflow means of containers located higher than said lowermost container with the container located directly underneath the same; conductor means located opposite said containers and said spraying edges and spaced from the same; a source of voltage connected to said conductor means and to said containers for producing a difference in potential between said containers and said conductor means whereby said liquid medium is urged to pass over said spraying edges toward said conductor means in an atomized condition; and a plurality of additional electrode means located intermediate said containers and said conductor means, said additional electrode means being electrically connected to said source of voltage for producing an additional potential capable of influencing the sprays of said medium passing over said spraying edges.

6. Electrostatic spraying apparatus comprising in combination, a plurality of containers arranged at different levels, a plurality of containers arranged at different levels, each container being formed with an opening at least partly bounded by a sharp spraying edge; pump means for supplying into the highest container a liquid medium adapted to be sprayed; overflow means on each of said containers for keeping the level of the medium at a constant level substantially at the elevation of the spraying edge associated therewith; a receptacle communicating with the overflow means of the lowermost container for receiving liquid medium overflowing from the same; overflow conduit means connecting said overflow means of containers located higher than said lowermost container with the container located directly underneath the same; conductor means located opposite said containers and said spraying edges and spaced from the same; a source of voltage connected to said conductor means and to said containers for producing a difference in potential between said containers and said conductor means whereby said liquid medium is urged to pass over said spraying edges toward said conductor means in an atomized condition; and at least one additional electrode means located intermediate said containers and said conductor means, said additional electrode means being arranged in the region of one of said container, said additional electrode means being electrically connected to said source of voltage for producing an additional potential capable of influencing the sprays of said medium passing over said spraying edges.

7. A spraying arrangement as claimed in claim 5 wherein said additional electrode means are rod-shaped electrodes arranged to form at least portions of the sides of a rectangle.

8. Electrostatic spraying apparatus comprising, in combination, stationary supporting means; stationary container means mounted on said supporting means and being formed with an opening partly bounded by a horizontal spray edge; supply means for supplying into said container means a liquid adapted to be sprayed; overflow means in said container means located at the horizontal level of said horizontal spray edge spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; and a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected.

9. Electrostatic spraying apparatus comprising, in combination, stationary supporting means; stationary container means mounted on said supporting means and being formed with an opening partly bounded by a horizontal spray edge; supply means for supplying into said container means a liquid adapted to be sprayed; overflow means in said container means located at the horizontal level of said horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; and spray control means for deflecting the spray passing over said spray edge in a direction transverse to the movement of the spray, said spray control means being located spaced from said container means and from said conductor means and intermediate the same.

10. Electrostatic spraying apparatus comprising, in combination, stationary supporting means; stationary container means mounted on said supporting means and being formed with an opening partly bounded by a horizontal spray edge; supply means for supplying into said container means a liquid adapted to be sprayed; overflow means in said container means located at the horizontal level of said horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; and spray control means for deflecting the spray passing over said spray edge in a direction transverse to the movement of the spray, said spray control means being located spaced from said container means and from said conductor means and intermediate the same, and including an electrode means insulated from said container means and having an electric potential for controlling the spray.

11. Electrostatic spraying apparatus comprising, in combination, stationary supporting means; stationary container means mounted on said supporting means and being formed with an opening partly bounded by a straight horizontal spray edge; supply means for supplying into said container means a liquid adapted to be sprayed; overflow means in said container means located at the horizontal level of said straight horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; spray control means for deflecting the spray passing over said spray edge in a direction transverse to the movement of the spray, said spray control means being located spaced from said container means and from said conductor means and intermediate the same, and including an electrode means insulated from said container means and having an electric potential for controlling the spray, said electrode means being located in the path of the spray so as to receive the potential of said container means through said spray.

12. Electrostatic spraying apparatus comprising, in combination, stationary supporting means; stationary container means mounted on said supporting means and being formed with an opening partly bounded by a horizontal spray edge; supply means for supplying into said container means a liquid adapted to be sprayed; overflow means in said container means located at the horizontal level of said horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; spray control means for deflecting the spray passing over said spray edge in a direction transverse to the movement of the spray, said spray control means being located spaced from said container means and from said conductor means and intermediate the same, and including an electrode means insulated from said container means and having an electric potential for controlling the spray; and an additional source of voltage connected to said electrode means for applying to the same an electric potential.

13. An electrostatic spraying apparatus as set forth in claim 12 and means for oscillating said electrode means.

14. An electrostatic spraying apparatus as set forth in claim 12 wherein said additional source of voltage produces a direct current voltage.

15. Electrostatic spraying apparatus comprising, in combination, stationary supporting means; stationary container means mounted on said supporting means and being formed with an opening partly bounded by a straight horizontal spray edge; supply means for supplying into said container means a liquid adapted to be sprayed; overflow means in said container means located at the horizontal level of said straight horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; and receptacle means located below said overflow means and said container means and communicating with said overflow means for receiving excess liquid from the same so that liquid collected in said receptacle means can be returned to said supply means for circulation.

16. Electrostatic spraying apparatus comprising, in combination, stationary supporting means; stationary container means mounted on said supporting means and being formed with an opening partly bounded by a straight horizontal spray edge; supply means for supplying into said container means a liquid adapted to be sprayed; overflow means in said container means located at the horizontal level of said straight horizontal spray edge inwardly spaced from the same for maintaining the level of the liquid in the container means substantially at the elevation of said spray edge so that no liquid tends to flow over said spray edge regardless of the amount of liquid supplied by said supply means; conductor means located opposite said spray edge spaced from the same; a rotary generator constituting a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; receptacle means located below said overflow means and said container means and communicating with said overflow means for receiving excess liquid from the same; rotary pump means for pumping liquid collected in said receptacle means to said supply means for circulation and being coaxial with said generator; and motor means for driving said pump means and said generator.

17. Electrostatic spraying apparatus comprising, in combination, stationary supporting means; stationary container means mounted on said supporting means and being formed with an opening partly bounded by a straight horizontal spray edge; supply means for supplying into said container means a liquid adapted to be sprayed; overflow means in said container means located at the horizontal level of said straight horizontal spray edge inwardly spaced from the same for maintaining the level of the liquid in the container means substantially at the elevation of said spray edge so that no liquid tends to flow over said spray edge regardless of the amount of liquid supplied by said supply means; a holder supporting said container means and said overflow means on said supporting means for angular adjustment about at least one horizontal axis spaced from said spray edge for placing said spray edge and said overflow means in the same horizontal plane; conductor means located opposite said spray edge spaced from the same; and a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected.

18. Electrostatic spraying apparatus comprising, in combination, stationary supporting means; stationary container means mounted on said supporting means and being formed with an opening partly bounded by a straight horizontal spray edge; supply means for supplying into said container means a liquid adapted to be sprayed; overflow means in said container means located at the horizontal level of said straight horizontal spray edge inwardly spaced from the same for maintaining the level of the liquid in the container means substantially at the elevation of said spray edge so that no liquid tends to flow over said spray edge regardless of the amount of liquid supplied by said supply means; a source of high voltage connected to said spray edge and to said conductor means whereby the liquid in said container is urged only by the electrostatic force produced by said source of high voltage to pass over said spray edge and in atomized condition toward said conductor means and toward objects associated with said conductor means and located in the region of the same opposite and spaced from said spray edge, while all liquid supplied in excess of the amount of liquid moved by the electrostatic force over said spray edge flows into said overflow means so that no liquid flows over said spray edge when said source of high voltage is disconnected; spray control means for deflecting the spray passing over said spray edge in a direction transverse to the movement of the spray, said spray control means being located spaced from said container means and from said conductor means and intermediate the same, and including an electrode means insulated from said container means and having an electric potential for controlling the spray, a movable support supporting said electrode means, and means for periodically moving said movable support and thereby said electrode means.

References Cited in the file of this patent

UNITED STATES PATENTS

| | | |
|---|---|---|
| 388,921 | Shartle | Sept. 4, 1888 |
| 913,008 | Herr | Feb. 23, 1909 |
| 1,191,216 | Nivling | July 18, 1916 |
| 1,958,406 | Darrah | May 15, 1934 |
| 2,048,651 | Norton | July 21, 1936 |
| 2,239,695 | Bennett | Apr. 29, 1941 |
| 2,615,822 | Huebner | Oct. 28, 1952 |
| 2,658,009 | Ransburg | Nov. 3, 1953 |
| 2,658,472 | Ransburg | Nov. 10, 1953 |
| 2,695,002 | Miller | Nov. 23, 1954 |
| 2,718,477 | Miller | Sept. 20, 1955 |
| 2,781,279 | Miller | Feb. 12, 1957 |

FOREIGN PATENTS

| | | |
|---|---|---|
| 505,005 | Belgium | Aug. 14, 1951 |
| 670,914 | Great Britain | Apr. 30, 1952 |
| 688,788 | Great Britain | Mar. 11, 1953 |
| 710,852 | Great Britain | June 23, 1954 |